United States Patent
Helt et al.

(10) Patent No.: US 7,140,410 B2
(45) Date of Patent: Nov. 28, 2006

(54) ASYMMETRIC TRUCK RACING TIRE

(75) Inventors: Jean-Nicolas Helt, Mont-Saint-Martin (FR); Pascal Patrick Steiner, Diekirch (LU); Fahri Ozel, Eischen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 183 days.

(21) Appl. No.: 10/888,215

(22) Filed: Jul. 9, 2004

(65) Prior Publication Data

US 2006/0005904 A1    Jan. 12, 2006

(51) Int. Cl.
*B60C 11/04* (2006.01)
*B60C 11/117* (2006.01)
*B60C 11/24* (2006.01)

(52) U.S. Cl. .............................. 152/154.2; 152/209.5; 152/209.8; 152/209.15; 152/209.16; 152/209.17; 152/456; 152/901

(58) Field of Classification Search ............. 152/209.8, 152/209.9, 154.2, 209.5, 209.15, 209.16, 152/209.17, 900, 901, 455, 456
See application file for complete search history.

(56) References Cited

U.S. PATENT DOCUMENTS

| | | | | |
|---|---|---|---|---|
| 3,155,135 | A * | 11/1964 | Klenk | 152/209.8 |
| 3,162,229 | A * | 12/1964 | Ellenrieder et al. | 152/209.8 |
| 3,286,756 | A * | 11/1966 | Ellenrieder et al. | 152/209.8 |
| 5,616,195 | A | 4/1997 | Marquet et al. | 152/209 R |
| 5,620,538 | A | 4/1997 | Oshima | 152/209 A |
| 5,622,575 | A * | 4/1997 | Meyer-Adlung et al. | 152/209.8 |
| D384,609 | S | 10/1997 | Gillard | D12/146 |
| D425,457 | S | 5/2000 | Gillard et al. | D12/146 |
| 6,116,309 | A | 9/2000 | Gillard et al. | 152/209.14 |
| D432,960 | S | 10/2000 | Feider et al. | D12/147 |
| 6,601,623 | B1 | 8/2003 | Katayama | 152/209.15 |
| 2005/0081971 | A1* | 4/2005 | Heinen | 152/209.1 |
| 2005/0269003 | A1* | 12/2005 | Fujii et al. | 152/154.2 |

FOREIGN PATENT DOCUMENTS

| | | | |
|---|---|---|---|
| DE | 4122648 | * | 1/1993 |
| EP | 250113 | * | 12/1987 |
| EP | 0 890 457 B1 | | 1/1999 |
| EP | 0 940 271 A2 | | 9/1999 |
| FR | 1498340 | * | 9/1967 |
| JP | 3-153401 | * | 7/1991 |
| JP | 10-151907 | * | 6/1998 |
| JP | 2002-240510 | * | 8/2002 |

* cited by examiner

*Primary Examiner*—Steven D. Maki
(74) *Attorney, Agent, or Firm*—Richard B. O'Planick

(57) ABSTRACT

An improved truck racing tire includes three belts and reduced tread and undertread thickness for weight reduction. An asymmetric shoulder design is provided and circumferential grooves having wear indicia therein at a preselected depth are incorporated into the tread to divide the tread into plural ribs. Notches are formed within the tread ribs in circumferential patterns of distribution at a depth equivalent to the depth of groove tread wear indicators. The tread is constructed of a relatively softer compound in the cap and a relatively harder compound in the base. The boundary between the cap and the base is at a depth corresponding to the notch depth and the wear indicators within the grooves to provide a further indication and confirmation of wear pattern and magnitude.

6 Claims, 9 Drawing Sheets

US 7,140,410 B2

ASYMMETRIC TRUCK RACING TIRE

FIELD OF THE INVENTION

The present invention relates generally to a truck tire and, more specifically, to an asymmetric tire tread and belt package construction truck racing tire applications.

BACKGROUND OF THE INVENTION

Tires generally have a tread that is well suited for a specific vehicle application. Certain tread and reinforcement packages specifically designed for a racing truck are well known. The considerations relevant to a tire for such an application are, among others, tread configuration, reinforcement package disposition, and material composition. While existing and commercially available tires developed for truck racing to date have worked well, certain shortcomings in such tires remain. In particular, existing truck racing tire designs are deficient in several key areas.

First, the weight and material utilization in currently available truck racing tires is greater than desired resulting in a tire with less than optimal temperature and weight characteristics. Another problem is that existing tire tread designs for truck racing applications experience irregular wear in the shoulder region of the tire and offer a less than optimal indication of wear. Such irregular shoulder wear results in unpredictable performance and a resultant competitive disadvantage. There is, therefore, a continuing need for a tire providing a predictable and accurate indication of wear in critical regions of the tire.

Still a further problem is that existing tread and tire designs provide less than satisfactory lateral stability and handling and lower than desired resistance in the event of tread damage. A continuing need, accordingly, exists for a truck racing tire that eliminates or mitigates the aforementioned deficiencies.

SUMMARY OF THE INVENTION

The invention provides an improved truck racing tire in which, in one aspect of the invention, three belts and a reduced tread thickness may be employed for weight reduction. In addition, a reduced distance between an uppermost belt and the tread may be utilized. In accordance with another aspect of the invention, an asymmetric shoulder design may be used for improved handling and high lateral stability. Pursuant to another aspect of the invention, circumferential grooves may be incorporated into the tread for water and heat evacuation and tread wear indicators may be positioned into the grooves for wear indication. Additionally, pursuant to yet a further aspect of the invention, notches may be formed in the shoulder and intermediary ribs in respective circumferential patterns for enhanced gripping on dust or water surfaces. A round shoulder located outside on the front axle and preferably inside on the rear axle may further be utilized to enhance vehicle stability and handling. According to yet another aspect of the invention, the tread and undertread thickness may be reduced for optimized weight and temperature characteristics and the tread may be constructed of a relatively softer compound is in the cap and a relatively harder compound is in the base. Pursuant to a further aspect of the invention, tread wear may be redundantly confirmed through the placement of the groove wear indicator at a depth common to the depth of notches in the shoulder and intermediary ribs. The boundary between the cap and the base tread regions may serve as a further indication of wear.

DEFINITIONS

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Carcass plies" comprise parallel longitudinal reinforcing members which are wrapped around the beads.

"Circumferential" means lines or directions extending along the perimeter of the surface of the annular tread perpendicular to the axial direction.

"Crown" refers to that portion of the tire within the width area of the tread in the vicinity of the tread.

"Design feature" includes enough of the tread pattern to constitute at least one notch on each tread region.

"Equatorial plane" refers to the plane perpendicular to the tire's axis of rotation and passing through the center of its tread. "Tread Shoulder Rib" refers to portion of tread adjacent the tire sidewall.

"Footprint" refers to the contact patch or area of contact of the tire tread with a flat surface at zero speed and under normal load and pressure or under specified load, pressure and speed conditions.

"Global treadwear" refers to normal treadwear, generally evenly distributed around a tire.

"Irregular treadwear" refers to uneven patterns of wear, sometimes localized where one side or edge of the tread wears faster than another.

"Lateral Edge" means the axially outermost extremes of the tread.

"Radial" and "radially" are used to mean directions radially toward or away from the axis of rotation of the tire.

BRIEF DESCRIPTION OF THE DRAWINGS

The invention will be described by way of example and with reference to the accompanying drawings in which.

DETAILED DESCRIPTION OF THE INVENTION

Figure 1:
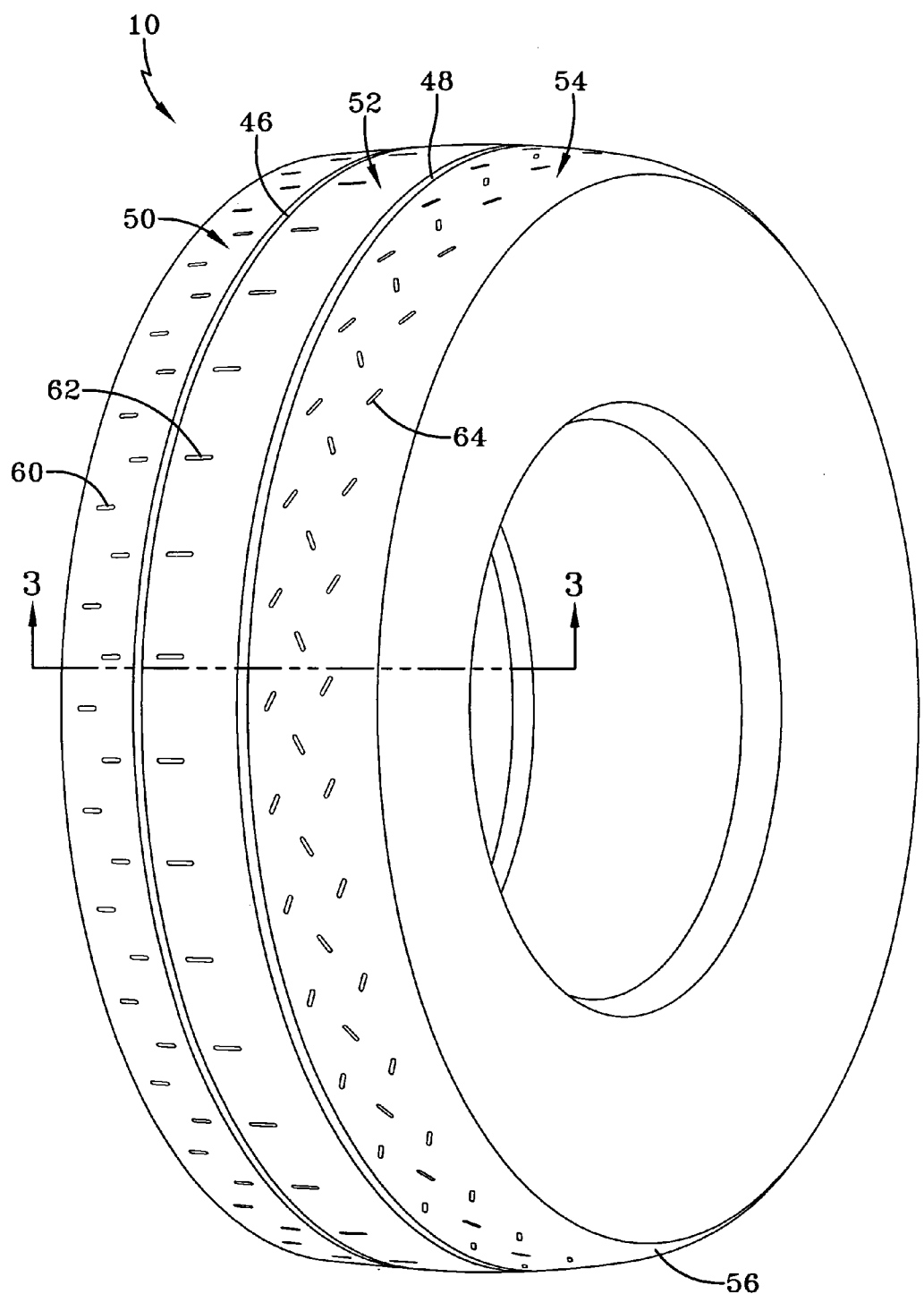
FIG. 1 is a perspective side elevation view of a tire configured according to the present invention.
Figure 2:
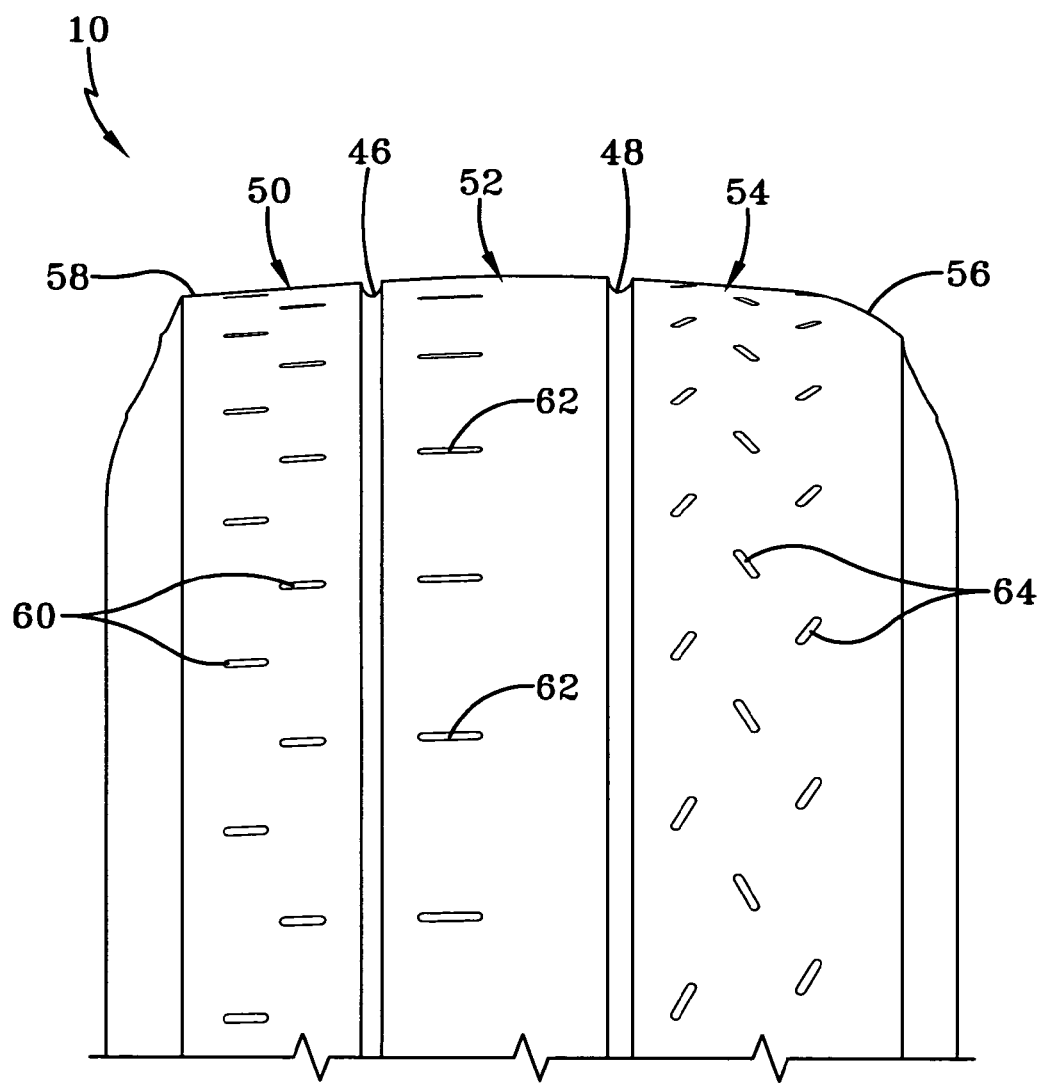
FIG. 2 is a front elevation view of a portion of the tire of FIG. 1.
Figure 3:
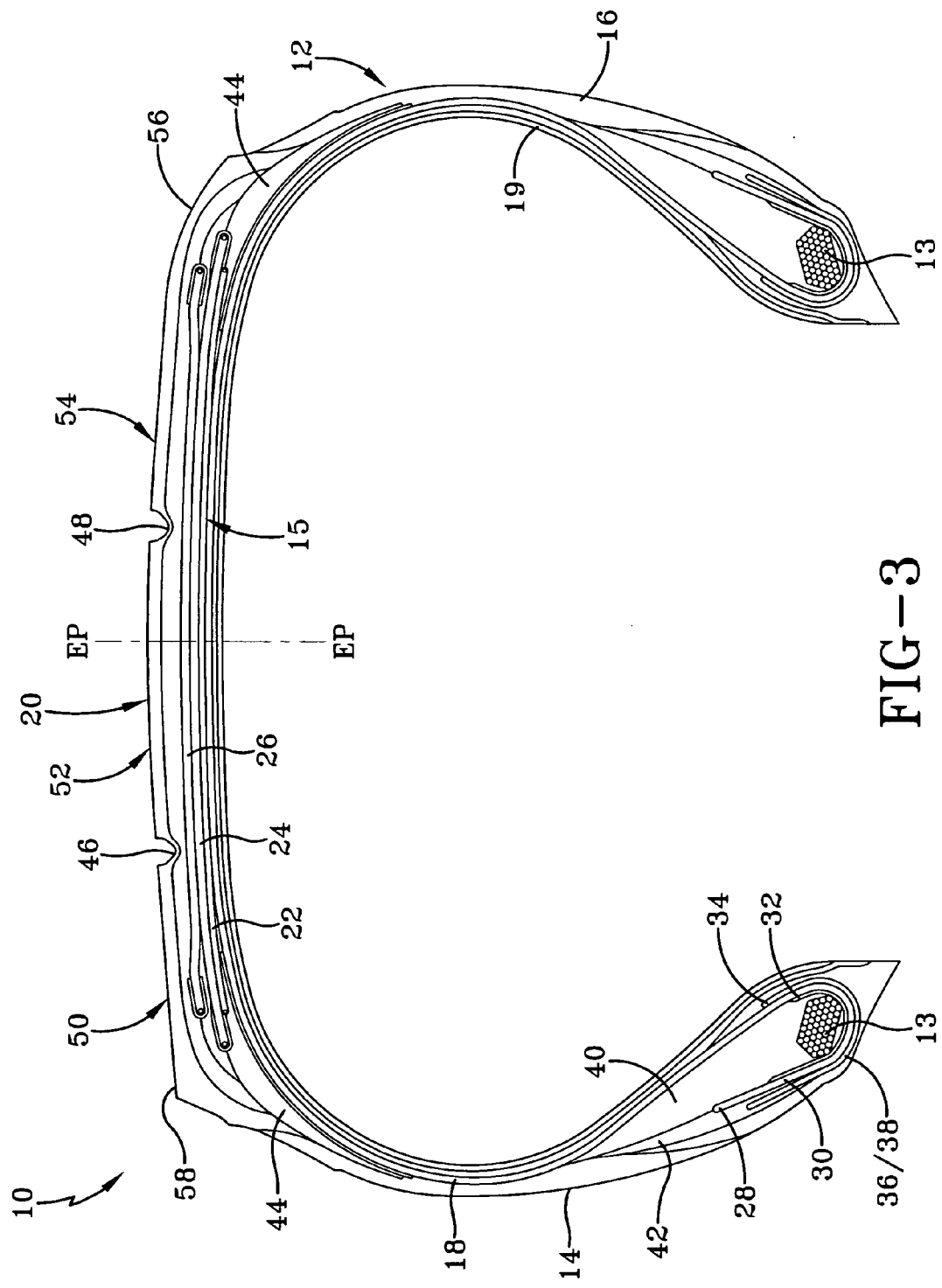
FIG. 3 is a transverse sectional view through the tire of FIG. 1.

With reference to FIGS. 1, 2, and 3, a truck racing tire 10 is depicted in accordance with the subject invention, preferably for use on either the front or rear axles of a racing truck. While intended specifically for truck racing tires, the principles of the invention will find alternative uses in other applications apparent to those skilled in the art.

The tire 10 has a tread 20 and a casing 12. The casing 12 has two sidewalls 14, 16 one or more radial plies 18 extending from and wrapped about two annular beads 13 and a belt reinforcement structure 15 located radially between the tread 20 and the plies 18.

The plies 18 and the belt reinforcement structure 15 are cord reinforced elastomeric material, the cords being preferably steel wire filaments and the elastomer preferably being a vulcanized rubber material. Similarly, the annular beads 13 have steel wires wrapped into a bundle known as the bead core.

The liner 19 is a component of preferably halobutyl rubber that forms a somewhat air impervious chamber to contain the air pressure when the tire 10 is inflated.

As shown, the belt structure of the preferred embodiment tire has three cord reinforced belts 22, 24, and 26. Additionally, the belt reinforcement structure 15 includes a gum strip of rubber material 28. The ply turnup 30 in the bead area is reinforced with a flipper 32, chipper 34, gum and fabric chafers 36, 38, gum strips 40 and elastomeric wedges 42 and a plurality of elastomeric strips or wedges 44 in the lateral extremes of the belts 15 in proximity of the tread lateral edge. Although not required to the practice of the inventive concept, these features are disclosed as features employed in the preferred embodiment.

The tread 20 preferably has a pair of circumferentially continuous grooves 46, 48 which divide the tread 20 into three tread ribs, including a pair of shoulder ribs 50, 54 separated by an intermediate rib 52. The tread 20 is asymmetrically configured in that the shoulder rib 54 is wider than the shoulder rib 50. The equatorial plane of the tire, as best seen in FIG. 3, extends off center through the center rib 52. The wide shoulder rib 54 is situated on the outside on a front axle of a truck or on the inside when mounted on a rear axle to optimize vehicle stability and handling. The rib 54 is configured having a rounded lateral edge surface 56 and the rib 50 is provided with an angled lateral edge surface 58 which optimize vehicle stability and handling. More grooves may be used dependent on the width of the tread and other design considerations such as, but not limited to, the alternatively configured tread depicted in FIGS. 13–15.

As shown in FIGS. 1–3, the tire 10 uppermost belt 26 is of relatively reduced distance from the tread 20, on the order of 2 to 5 mm. Additionally, the tread 20 is configured to be relatively reduced thickness, preferably dimensioned as 5 mm. The reduced thickness of tread and undertread between the tread 10 and belt 26 reduces material content, for optimized handling, stability, and temperature control.

Figure 6:
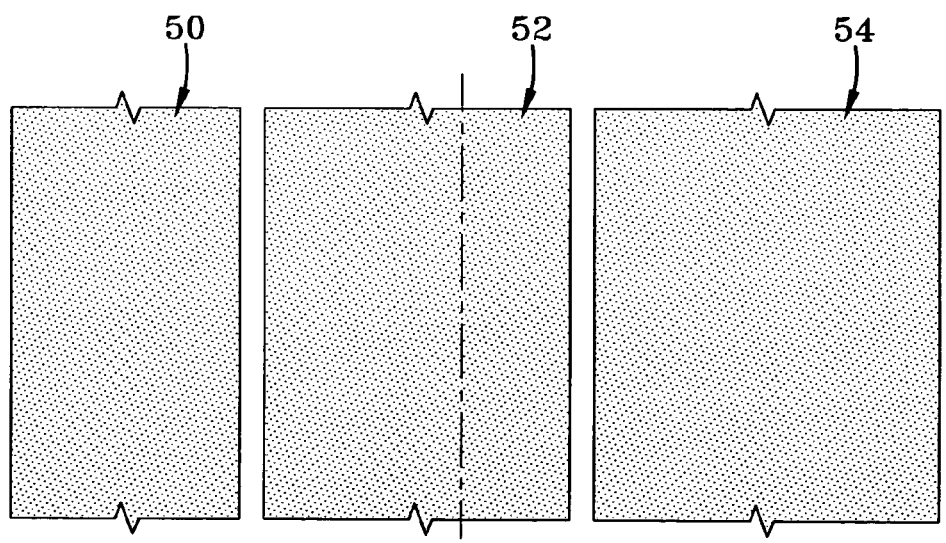
FIG. 6 is a top plan view of a tire tread portion indicating a wear condition.
Figure 7:
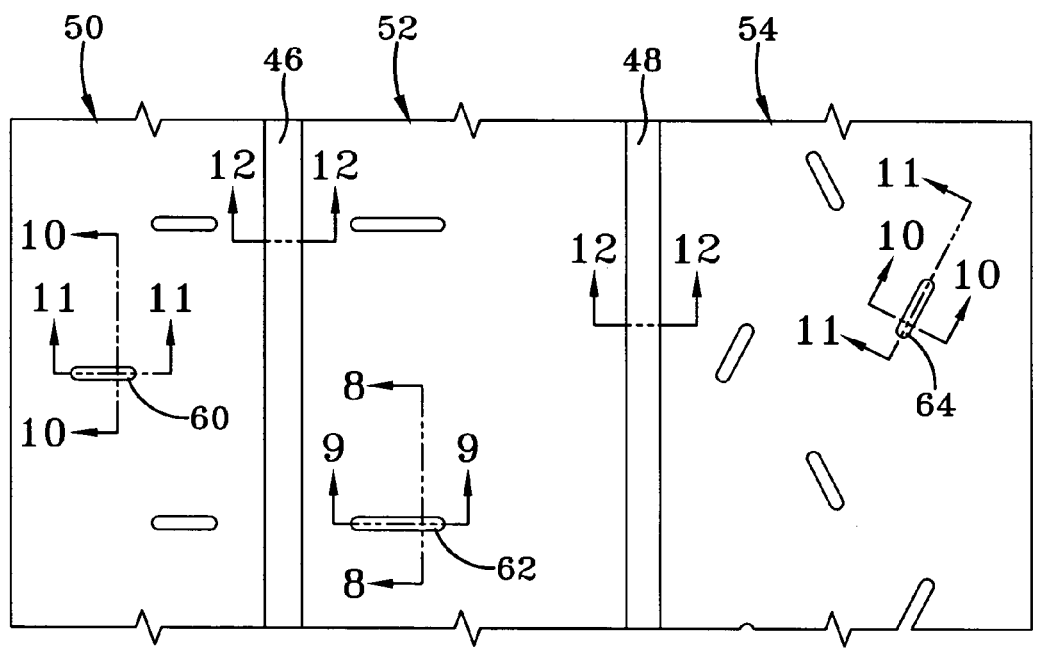
FIG. 7 is a top plan view of a tire tread portion showing notch patterns within each tread rib.
Figure 8:
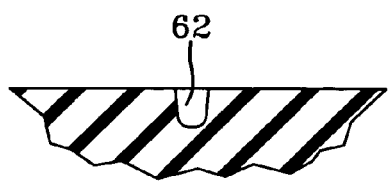
FIG. 8 is a section view through a notch of FIG. 7 taken along the line 8—8.
Figure 9:
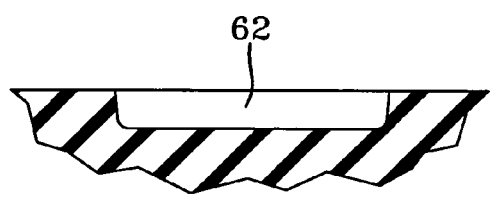
FIG. 9 is a longitudinal section view through a notch of FIG. 7 taken along the line 9—9.
Figure 10:
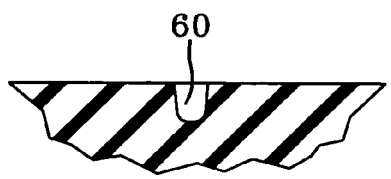
FIG. 10 is a transverse section view through a notch of FIG. 7 taken along the line 10—10.
Figure 11:
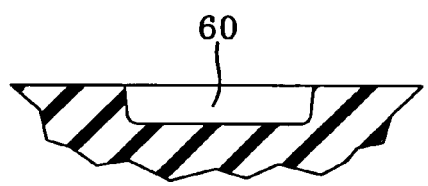
FIG. 11 is a longitudinal section view through a notch of FIG. 7 taken along the line 11—11.
Figure 12:
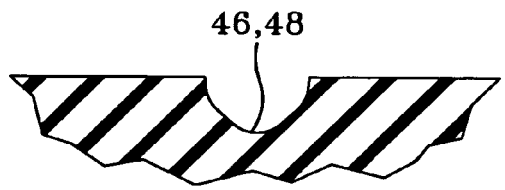
FIG. 12 is a transverse section view through a groove of FIG. 7 taken along the line 12—12.

In use, the tire ribs 50, 52, and 54 wear and the rib depth is reduced. In order to indicate tread wear, a respective pattern of circumferentially spaced notches 60, 62, 64 are formed therein, respectively. As the tread wears, the notches are reduced in depth and eventually eliminated as depicted in FIG. 6. In practice, the tread will generally wear at different rates causing the notches to reduce in depth accordingly. By monitoring the depths of the notches, the wear pattern and level of wear may be ascertained. Each notch 60, 62, 64, as shown in FIGS. 7–12, are generally U-shaped in cross-section and has an initial depth of 3.5 mm. The depth of the grooves 46, 48 (see FIG. 12) is preferably on the order of 5.1 mm. Wear indicators in the form of markings are placed in sidewalls of the grooves (not shown) at a depth equivalent to the depth of notches 60, 62, 64 (preferably 3.5 mm) thus providing an additional indication of wear as the tread 20 is reduced. It will further be noted that the notch pattern in each rib 50, 52, 54 is preferably distinctive to each rib and the notches may be oriented in a staggered configuration from rib to rib or, as shown with regard to rib 54, and/or oriented at an angle relative to the equatorial plane of the tire. By varying the distribution and orientation of the notches from tire rib to tire rib and around the circumference of the tire, a clearer indication of wear pattern and extent may be determined.

Figure 4:
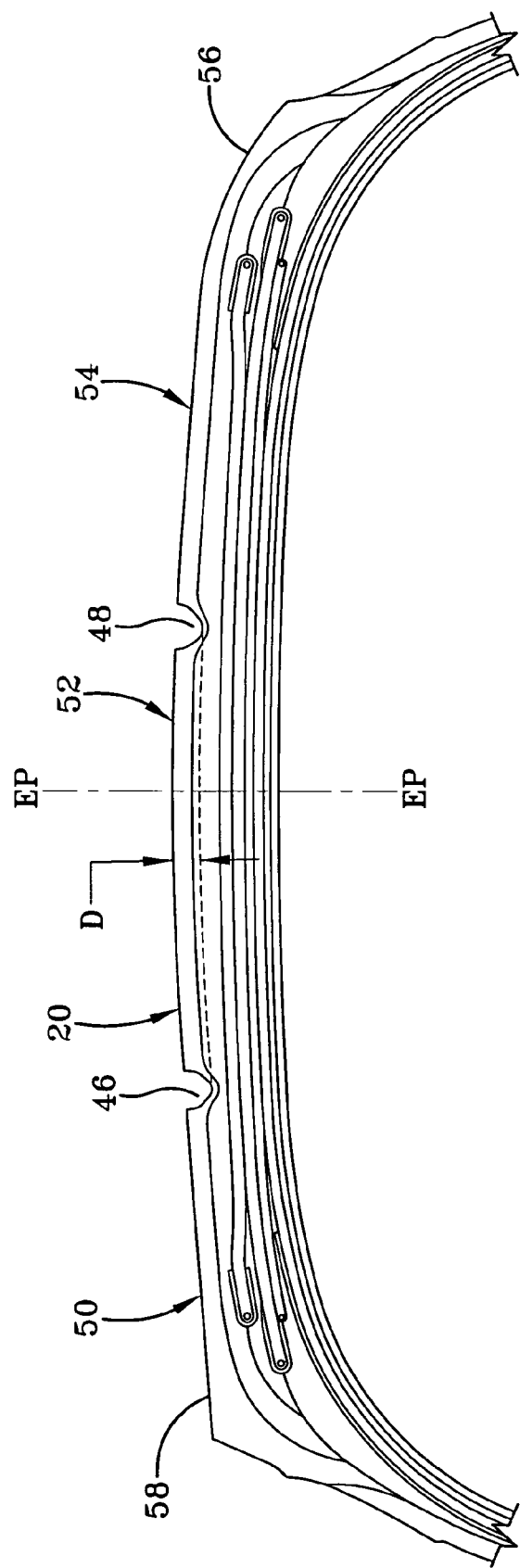
FIG. 4 is an enlarged section view of the tread portion of the tire of FIG. 1.
Figure 5:
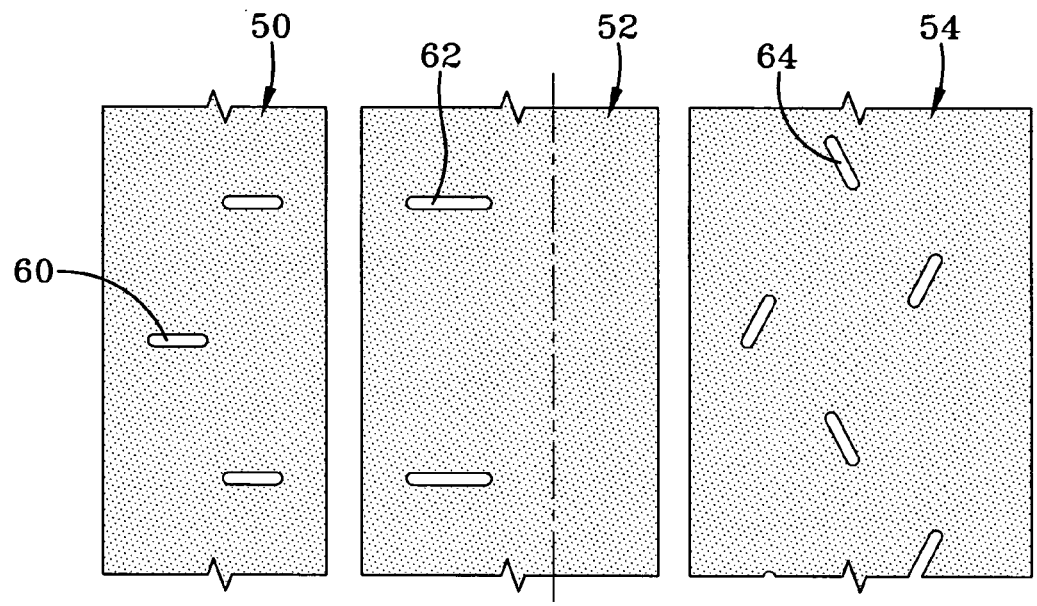
FIG. 5 is a top plan view of a portion of the tire tread.

Additionally, it is preferred that the tread 20 be configured as having a cap/base layer construction in which the cap is composed of a relatively softer compound while the base compound is composed of a harder compound. Such compounds are commercially available. The softer cap compound provides high griping and handling performance characteristics while hard and cool running compound in the tread base improves tire lateral stability and handling, reduces heat generation, and improves the tire's resistance characteristics in the event the tread is damaged. Location of the cap and base boundary is further preferably at 3.5 mm from the tread surface so that the allow the user to detect the harder base layer when the tread cap is worn away. FIG. 4 illustrates in broken line the boundary between the softer cap and harder base at a depth "D". Thus, the dual composition of the tread along a boundary line placed at the same depth as the notch and groove depths provides yet a further indication of tire wear. Such a redundancy increases the likelihood that the driver will immediately detect an unsafe wear condition within the tire.

Figure 13:
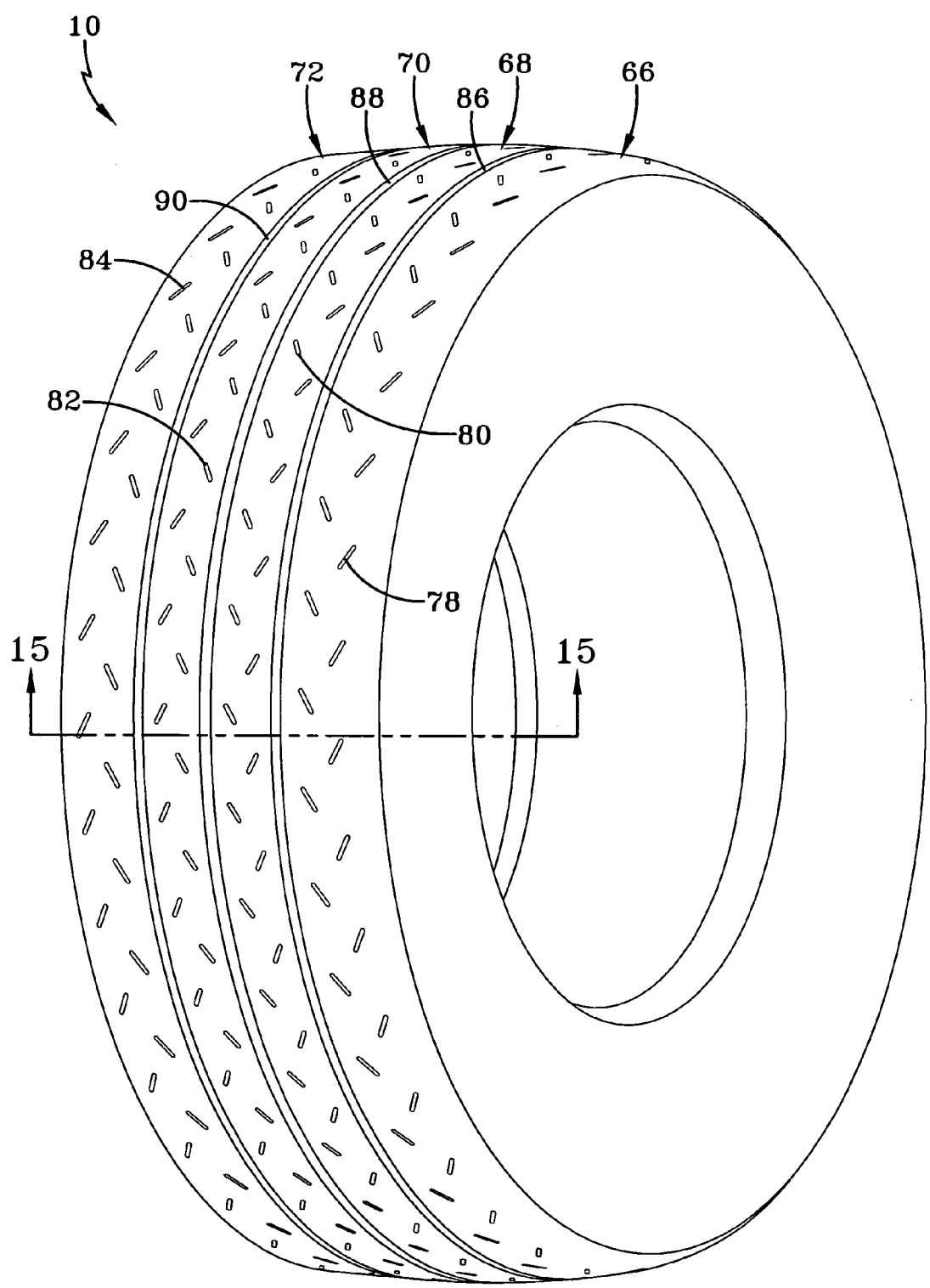
FIG. 13 is a perspective side elevation view of an alternative embodiment of a tire configured pursuant to the invention.
Figure 14:
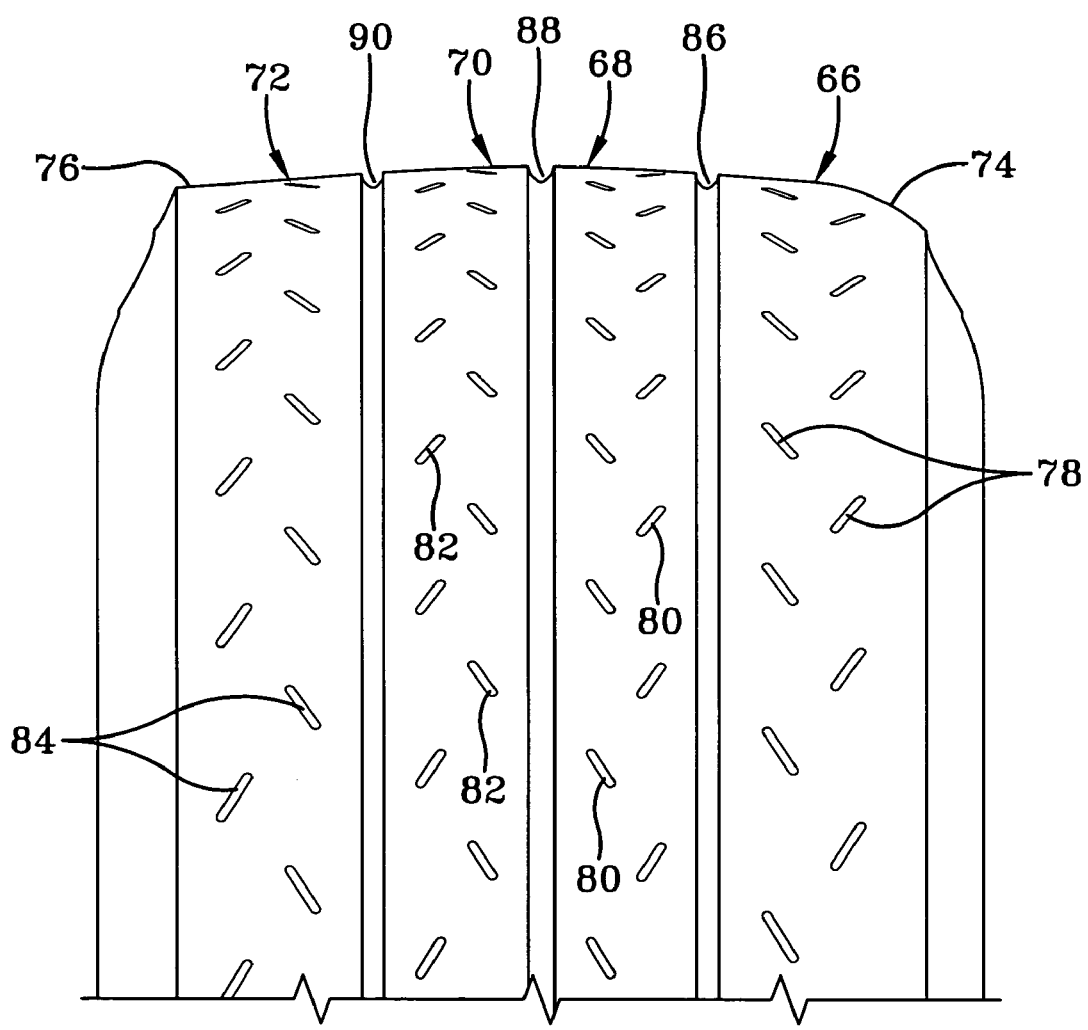
FIG. 14 is a front elevation view of a portion of the tire of FIG. 13.
Figure 15:
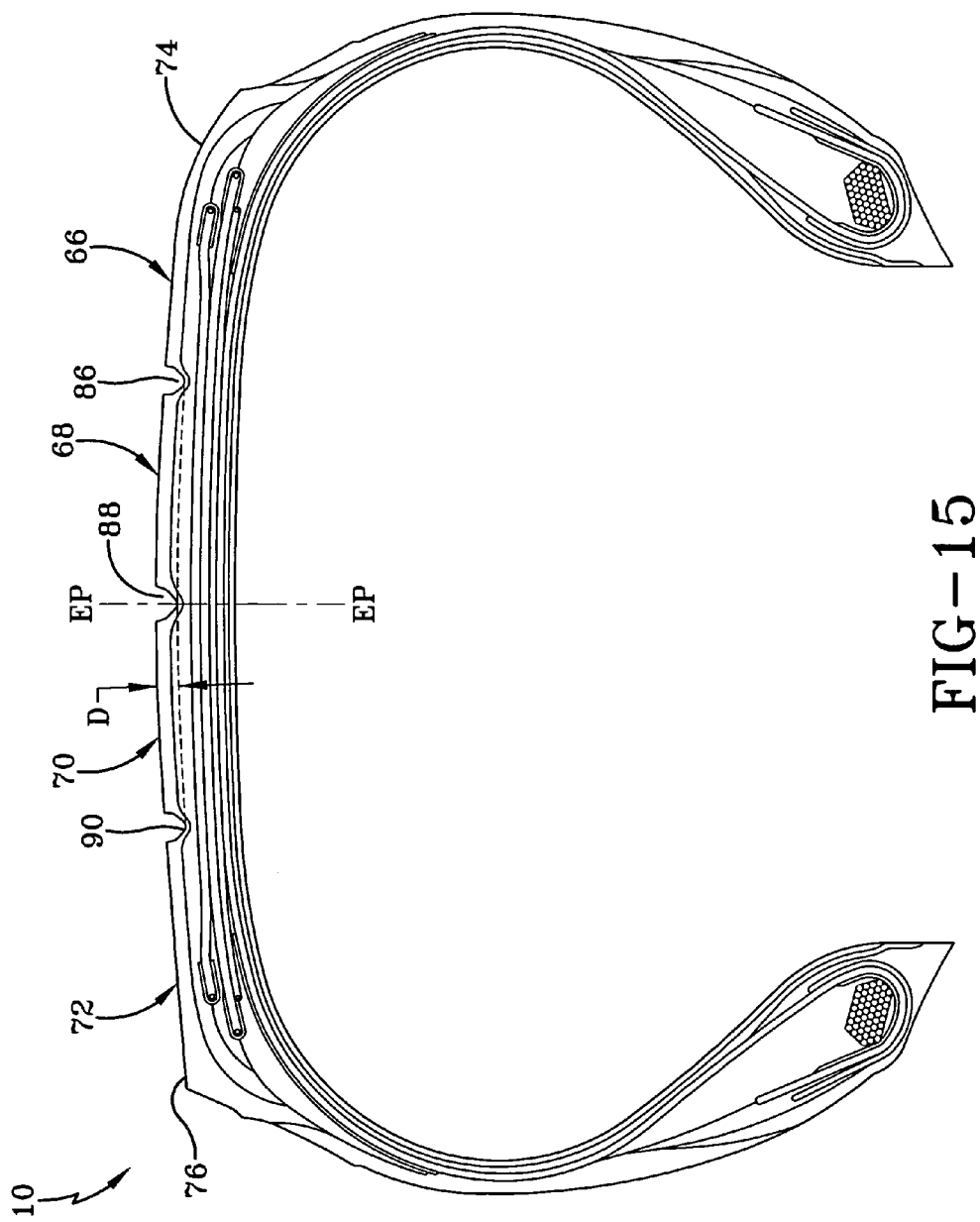
FIG. 15 is a transverse section view through the tire of FIG. 13.

FIGS. 13–15 illustrate one alternative embodiment of invention in which four ribs 66, 68, 70, and 72 are provided, outermost shoulder ribs 66, 72 having a rounded shoulder 74 and a squared shoulder region, respectively. Notches 78, 80, 82, 84, as in the previous embodiment, are incorporated into the ribs for heat and water evacuation as well as for tread wear indication. Grooves 86, 88, and 90 extend circumferentially and define the ribs.

From the foregoing, it will be apparent that the subject tire for truck racing in a unique belt package, tread pattern and composition provides enhanced handling, tire grip, and tread endurance while optimizing weight. The wider shoulder rib provides for good handling and high lateral stability and the circumferential grooves for water and heat evacuation. The tread wear indicators in the grooves provide for wear follow-up and are at a depth common to the depth of the rib notches. The notches in the ribs provide gripping on dust or water and also, being distributed in select patterns circumferentially, provide for localized wear detection. The rounded shoulder is placed preferably outside on a front axle and inside on a rear axle to optimize vehicle stability and handling.

In using three belts, rather than a greater number, weight is reduced and better temperature dispersion is achieved.

Moreover, the undertread thickness is reduced for optimized weight and temperature characteristics. Use of a softer cap composition and harder base composition in the tread acts to prevent rapid damage to the tire and wear from reaching the carcass. The point in time when the tire is worn will be perceived by the user due to the position of the boundary between the softer cap and the harder tread base at a depth common to the notch tread wear indicators.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic radial ply truck tire having a tread with a tread depth D, at least two circumferential grooves dividing the tread into at least a first shoulder circumferential rib, an intermediary circumferential rib, and a second shoulder circumferential rib, the tire being characterized by:

the tread having a first wear indicator disposed within at least one circumferential groove and a second wear indicator disposed within a rib for confirmation of tread wear;

a plurality of elongate discrete notches formed to extend into the tread first shoulder rib, second shoulder rib, and intermediary rib in respective circumferential patterns;

at least one notch in each circumferential pattern extends to a depth corresponding with the depth of the first wear indicator within the at least one circumferential groove.

2. A tire according to claim 1, wherein the second wear indicator comprising a tread base region disposed at depth D constructed from relatively harder material and a cap region over the base region constructed from relatively softer material, the base region and the cap region adjoining along a boundary.

3. A tire according to claim 2 wherein the first wear indicator within the at least one groove is at the depth of the boundary between the base region and the cap region.

4. An asymmetric pneumatic radial ply truck tire having a tread with a tread depth D, at least two circumferential grooves dividing the tread into at least a first shoulder circumferential rib, an intermediary circumferential rib, and a second shoulder circumferential rib, the tire being characterized by:

the first shoulder rib having a width wider than the second shoulder rib and a substantially rounded upper surface across an outer edge region;

the second shoulder rib having a substantially flat upper surface across an outer edge region; and the tread having a base region disposed at depth D constructed from relatively harder material and a cap region over the base region constructed from relatively softer material, the base region and the cap region adjoining along a boundary;

wherein at least one groove has a wear indicator formed therein at a preselected depth;

wherein the boundary between the base region and the cap region is substantially at the preselected wear indicator depth within the one groove; and at least one tread region has at least one notch formed therein extending to the preselected wear indicator depth.

5. An asymmetric pneumatic radial ply truck tire having a tread with a tread depth D, at least two circumferential grooves dividing the tread into at least a first shoulder circumferential rib, an intermediary circumferential rib, and a second shoulder circumferential rib, the tire being characterized by:

the first shoulder rib having width wider than the second shoulder rib and a substantially rounded upper surface across an outer edge region;

the second shoulder rib having a substantially flat upper surface across an outer edge region; and the tread having a first wear indicator disposed within at least one circumferential groove and a second wear indicator disposed within a rib for confirmation of tread wear; and wherein the second wear indicator comprising at least one notch formed to extend into at least one rib to a depth substantially corresponding to the depth of the first wear indicator.

6. An asymmetric pneumatic radial ply truck tire having a tread with a tread depth D, at least two circumferential grooves dividing the tread into at least a first shoulder circumferential rib, an intermediary circumferential rib, and a second shoulder circumferential rib, the tire being characterized by:

the first shoulder rib having width wider than the second shoulder rib and a substantially rounded upper surface across an outer edge region;

the second shoulder rib having a substantially flat upper surface across an outer edge region; and the tread having a first wear indicator disposed within at least one circumferential groove and a second wear indicator disposed within a rib for confirmation of tread wear;

a plurality of elongate discrete notches formed to extend into the tread first shoulder rib, second shoulder rib, and intermediary rib in respective circumferential patterns at least one notch in each circumferential pattern extends to a depth corresponding with the depth of the first wear indicator within the at least one circumferential groove.

* * * * *